United States Patent [19]

Yosida

[11] Patent Number: 4,686,247

[45] Date of Patent: Aug. 11, 1987

[54] ADHESIVE COMPOSITION

[75] Inventor: Ethuo Yosida, Kameoka, Japan

[73] Assignee: Ohara Paragium Chemical Co., Ltd., Kyoto, Japan

[21] Appl. No.: 884,338

[22] Filed: Jul. 11, 1986

[30] Foreign Application Priority Data

Jan. 21, 1986 [JP] Japan .................................. 61-11515

[51] Int. Cl.$^4$ .............................................. C08K 9/06
[52] U.S. Cl. .................................. 523/213; 524/533; 524/535; 524/850
[58] Field of Search ................ 523/213; 524/533, 535, 524/850

[56] References Cited

U.S. PATENT DOCUMENTS

| | | | |
|---|---|---|---|
| 3,963,627 | 6/1976 | Cottrell | 428/405 |
| 4,116,919 | 9/1978 | Elias et al. | 523/213 |
| 4,170,585 | 10/1979 | Motegi et al. | 526/285 |
| 4,173,560 | 11/1979 | Homan et al. | 523/213 |
| 4,293,397 | 10/1981 | Sato et al. | 528/38 |
| 4,335,035 | 6/1982 | Hatanaka et al. | 523/213 |
| 4,374,753 | 2/1983 | Pullukat et al. | 526/348.5 |
| 4,447,495 | 5/1984 | Engle, III | 523/213 |
| 4,450,265 | 5/1984 | Harris | 526/204 |
| 4,477,607 | 10/1984 | Litke | 524/850 |
| 4,512,876 | 4/1985 | Miale et al. | 585/408 |
| 4,533,422 | 8/1985 | Litke | 524/850 |
| 4,571,372 | 2/1986 | Urawa et al. | 430/122 |

Primary Examiner—Joseph L. Schofer
Assistant Examiner—N. Sarofim
Attorney, Agent, or Firm—Armstrong, Nikaido, Marmelstein & Kubovcik

[57] ABSTRACT

An adhesive composition characterized in that the composition is prepared by subjecting finely divided hydrophobic silica surface-treated with hexamethyldisilazane to a heat treatment under a reduced pressure, subsequently treating the silica with an acid gas, and admixing the resulting silica with an α-cyanoacrylate.

5 Claims, No Drawings

ADHESIVE COMPOSITION

The present invention relates to α-cyanoacrylate adhesive compositions, and more particularly to α-cyanoacrylate adhesive compositions containing a thixotropic agent.

Alpha-cyanoacrylate adhesives based on esters of cyanoacrylic acid are well known as rapidly setting adhesives. It is also known to admix thixotropic agents with these adhesives to give them thixotropy.

Such thixotropic agents include finely divided hydrophobic silica prepared by rendering finely divided hydrophilic silica hydrophobic, for example, by treating the hydrophilic silica with a silicon compound such as polydimethylsiloxane, trialkoxyalkylsilane, dimethyldichlorosilane or the like to substitute hydrophobic groups for the hydrophilic hydroxyl groups covering the surface of the silica.

It is further known that finely divided hydrophobic silica surface-treated with hexamethyldisilazane (hereinafter referred to as "HMDS") is also usable as a thixotropic agent for α-cyanoacrylates. The hydrophobic silica surface-treated with HMDS is prepared basically from hydrophilic silicon dioxide by reacting HMDS with the hydroxyl groups covering the silica surface to substitute trimethylsiloxyl groups for the hydroxyl groups. The hydrophobic silica thus surface-treated with HMDS has high affinity for α-cyanoacrylates and can be dispersed highly uniformly when adjusted to have specified characteristics values, making it possible to readily provide pastes of thixotropic adhesive compositions.

However, α-cyanoacrylate adhesive compositions incorporating the HMDS-treated hydrophobic silica are not usable with satisfactory stability. For example, the composition markedly thickens or hardens in one or two days when tested for storage stability with heating at 70° C. In fact, a part of compositions has the fatal drawback of hardening within less than one day when tested for stability at 82° C. as disclosed in U.S. Pat. No. 4,477,607 and U.S. Pat. No. 4,533,422.

Accordingly, an object of the present invention is to provide an α-cyanoacrylate adhesive composition which has incorporated therein the hydrophobic silica surfacetreated with HMDS and which is free of the above drawback.

Another object of the present invention is to develop an α-cyanoacrylate adhesive composition which contains hydrophobic silica surface-treated with HMDS (hereinafter referred to as "HMDS-silica") and which is outstanding in storage stability.

Another object of the present invention is to develop an α-cyanoacrylate adhesive composition which contains HMDS-silica and which does not thicken or harden even when tested for stability at 70° C. for a prolonged period of time.

These objects and other features of the present invention will become apparent from the following description.

The above objects of the present invention can be fulfilled by subjecting HMDS-silica to two specified treatments, i.e., heat treatment under a reduced pressure and subsequent treatment with an acid gas, and admixing the resulting silica with an α-cyanoacrylate.

More specifically, the present invention provides an adhesive composition which is characterized in that the composition is prepared by subjecting finely divided hydrophobic silica surface-treated with hexamethyldisilazane to a heat treatment under a reduced pressure, subsequently treating the silica with an acid gas, and admixing the resulting silica with an α-cyanoacrylate.

The present invention is distinctly characterized in that HMDS-silica is heated under a reduced pressure and then treated with an acid gas.

When thus treated specifically and admixed with an α-cyanoacrylate, HMDS-silica affords a very stable composition exhibiting very high stability and undergoing little or no thickening or hardening over a prolonged period of time, for example, when tested for stability at 70° C.

Although the reason why the specifically treated HMDS-silica exhibits such an outstanding effect still remains to be fully clarified, HMDS-silica fails to show the effect when subjected to the reduced-pressure heat treatment only or to the acid gas treatment only. It is the two procedures of reduced-pressure heat treatment and acid gas treatment that enable HMDS-silica to exhibit the outstanding effect. For instance, Examples given below show that if HMDS-silica is merely heated at a reduced pressure, the composition obtained markedly thickens or hardens in one or two days when tested for stability at 70° C. Further HMDS-silica, if merely treated with an acid gas, provides a composition which greatly thickens or hardens in three to four days and which requires an especially prolonged initial setting time.

According to the present invention, HMDS-silica is first heated under a reduced pressure. The lower the pressure, the better. The pressure is usually up to 10 mm Hg, preferably up to about 1 mm Hg. The heat treatment is conducted at 40° to 200° C., preferably about 60 to about 120° C., for 5 to 30 hours, preferably about 7 to about 18 hours.

Typical of HMDS-silica to be treated according to the present invention are Tullanox TM 500 (brand name, product of Tulco Co., U.S.A.), Aerosil R812 and RX-200 (brand names, sold by Nippon Aerosil Co., Ltd.), etc.

The heat-treated silica is then treated with an acid gas. The acid gas is defined as "a compound which is in the form of a gas at a pressure of 760 mm Hg and at room temperature (15° to 25° C.) and is capable of accepting electron (or electron pair) in the gas phase." Examples of preferred compounds are fluorides of elements from the groups III to V, such as $BF_3$, $SiF_4$, $PF_5$ and $POF_3$, hydrogen halides such as HCl, HF, HBr and HI, and acid oxides such as $SO_2$, $CO_2$ and NO. The silica is treated with the acid gas to such an extent that when the resulting silica is dispersed in a mixture of 50 vol. % of methanol and 50 vol. % of water to a concentration of 4 wt. %, the mixture exhibits a pH of 2.6 to 6.2, preferably about 3.0 to about 5.7. If the pH is lower than 2.6, the adhesive composition obtained by admixing the silica with an α-cyanoacrylate tends to require a longer setting time although having high stability, whereas if it is higher than 6.2, there is a tendency for the composition to exhibit unsatisfactory storage stability although the setting time is shorter.

The hydrophobic silica of the present invention thus specifically treated by the two steps usually has the following properties (characteristics values).

Specific surface area: At least 70 $m^2/g$, preferably at least about 100 $m^2/g$.

Bulk density: Up to 60 g/liter, preferably up to 50 g/liter.

Particle size: Up to 12 mμ, preferably up to 9 mμ.

Contact angle: At least 60 degrees, preferably at least 90 degrees, most preferably at least 120 degrees.

These properties are determined by the following methods.

Specific surface area:

Measured by the BET method (nitrogen adsorption method) using a surface area measuring device.

Bulk density:

The specimen as placed on a sheet of paper is slowly placed into a 100-ml graduated cylinder to a volume of 100 ml without being subjected to any impact. The weight difference of the cylinder before and after the placement of the specimen is measured.

Bulk density (g/liter) = weight of specimen (g) × 10

Particle size:

The diameters of about 3000 primary particles are measured from an electron microphotograph of the specimen, and the arithmetic mean of the values is calculated.

Contact angle:

The contact angle is measured by dispersing 1 wt. % of the specimen in isopropanol, dipping a piece of filter paper of suitable size (No. 50 for paper chromatograph, product of Toyo Roshi Co., Ltd.) in the dispersion, then drying the paper at room temperature (20° to 30° C.) for 3 hours, subsequently allowing a drop of water (0.1 ml) to stand on the paper for 5 minutes and thereafter measuring the contact angle of the water drop.

When the specific surface area is less than 70 m$^2$/g, the adhesive composition prepared by admixing HMDS-silica with an α-cyanoacrylate has reduced thixotropy (is less likely to become pasty), exhibiting a tendency for the silica to separate from the composition. When the bulk density is greater than 60 g/liter, the silica, even if adjusted to a pH suited to the invention, results in the tendency that the composition obtained requires a longer setting time.

When greater than 12 mμ in particle size, the silica tends to give a reduced bond strength to the adhesive composition in which it is incorporated. If smaller than 60 degrees in contact angle, the silica is not smoothly dispersible in α-cyanoacrylates, fails to give satisfactory thixotropy and is likely to separate from the composition during storage.

A wide variety of α-cyanoacrylates heretofore used for adhesive compositions of the type described are usable in this invention. Such compounds are represented by the formula (1)

$$\begin{array}{c} \text{CN} \\ | \\ \text{CH}_2\text{=C-COOR} \end{array} \quad (1)$$

wherein R is a straight-chain or branched alkyl having 1 to 16 carbon atoms, allyl or substituted or unsubstituted phenyl. These compounds are usable singly or in admixture. Stated more specifically, the alkyl in the formula (1) may have a halogen atom or alkoxy substituent. The phenyl may have at least one substituent such as a halogen atom or alkoxyl. Examples of typical alkoxyl groups are lower alkoxyl groups.

The adhesive composition of the present invention comprises at least one of the α-cyanoacrylates represented by the formula (1) and HMDS-silica treated by the above two treatments in an amount of 0.5 to 12 wt. %, preferably 3 to 10 wt. %, based on the composition. If the amount is less than 0.5 wt. %, the composition will not have sufficient thixotropy even when containing a thickener such as an organic polymer mentioned below, whereas if the amount exceeds 12 wt. %, the composition is in the form of a hard paste and is inconvenient to use.

The α-cyanoacrylate to be used as the main component of the present adhesive composition is liable to anionic polymerization as is well known, so that it is desirable to add an anionic polymerization inhibitor to the present composition. Various anionic polymerization inhibitors heretofore used for adhesives of the present type are usable. Examples of preferred inhibitors are $SO_2$, $BF_3$, NO, aromatic sulfonic acids, alkylsulfonic acids, etc.

Further according to the present invention, a radical polymerization inhibitor is usable in combination with the anionic polymerization inhibitor when so required. Examples of useful radical polymerization inhibitors are those heretofore used, such as hydroquinone, pyrogallol, hydroquinone monomethyl ether and the like.

While the amounts of such inhibitors to be used vary with the kind of inhibitors, the anionic polymerization inhibitor is used generally in an amount of 1 to 400 ppm, preferably 5 to 100 ppm, and the radical polymerization inhibitor in an amount of 1 to 2000 ppm, preferably 10 to 1200 ppm.

Other additives heretofore used for α-cyanoacrylate adhesives of the type mentioned can be incorporated into the adhesive composition of the present invention. Such additives include organic polymers which assist in dispersing the hydrophobic silica of the invention in α-cyanoacrylates and serve to prevent the possible separation of the silica during storage. Typical of such polymers are polymethyl methacrylate, methacrylic copolymers, hydroxypropylcellulose acetate, etc. These polymers are used in an amount of 0 to 7 wt. %, preferably about 0.5 to about 2.5 wt. %, based on the composition.

Other useful additives are plasticizers, such as dioctyl phthalate, sebacic acid esters and phosphoric acid esters, for giving improved flexibility to the polymer on curing. According to the contemplated purpose, perfumes, dyes, etc. may be added to the adhesive composition suitably insofar as the stability of the composition is not impaired.

Like the conventional α-cyanoacrylate adhesives, the composition of the invention, which is serviceable as an rapidly acting adhesive, is usable for metals such as iron, stainless steel, copper, aluminum and ferrite, plastics, wood, rubber, glass, ceramics, leather, paper, fabrics, etc.

EXAMPLE 1

Hydrophobic silica surface-treated with HMDS was treated according to the present invention as shown in Table 1. The hydrophobic silica thus treated was admixed with an α-cyanoacrylate to prepare an adhesive composition, which was then tested for stability. Table 2 shows the result.

The silica material was treated according to the invention as follows. The heat treatment was conducted at a reduced pressure of 0.5 to 1.0 mm Hg at 60° to 65° C. for 15 hours. The acid gas treatment was conducted by holding the silica in contact with $BF_3$ for 5 to 7 minutes at a reduced pressure of 42 to 43 mm Hg at room temperature. The degree of the acid gas treatment is expressed in terms of pH.

For comparison, hydrophobic silica surface-treated with HMDS was merely heated at 205° C. for 15 minutes and then used as Comparative Example.

Table 2 shows the results achieved by the compositions thus prepared with use of hydrophobic silica surface-treated with HMDS. The compositions incorporating the hydrophobic silica as merely heat-treated had the drawback that they gelled in 1 to 2 days when heated at 70° C. and was not usable with good stability, whereas the compositions incorporating the hydrophobic silica as treated according to the invention exhibited high stability even after having been heated under the same condition for 16 days.

According to JIS K 6861-1977 using a test specimen of NBR.

Accelerated degradation test:

The specimen was placed into a polyethylene tube and an aluminum tube, both 2 to 3 g in capacity, the tubes were then allowed to stand in an oven maintaining at 70±2° C., and the contents were checked for stability.

TABLE 1

| | pH of hydrophobic silica | | | |
|---|---|---|---|---|
| | Comparative Example | Treatments of the invention | | |
| | | 1st treatment | 2nd treatment | |
| Hydrophobic | Heated at 205° C. | Heated in | Treated with acid gas | |
| silica | Untreated | for 15 minutes | vacuum | Adjustment 1 | Adjustment 2 |
| A | 9.7 | 8.5 | 7.1 | 5.7–6.2 | 2.7–5.5 |
| B | 7.3 | 7.2 | 6.9 | 5.6–6.1 | 3.1–5.4 |
| C | 7.6 | 7.4 | 7.1 | 5.6–6.1 | 2.6–5.3 |
| D | 7.5 | 7.1 | 6.8 | 5.7–6.2 | 3.2–5.5 |

Note: A-D: Hyrophobic silicas surface-treated with HMDS.
A: Tullanox TM 500 (product of Tulco Co., U.S.A)
B: Aerosil R812
C: Aerosil RX170
D: Aerosil RX200
B-D: Sold by Nippan Aerosi Co., Ltd

TABLE 2

| Components of adhesive composition | | Accelerated degradation test with heating at 70° C. | | | | |
|---|---|---|---|---|---|---|
| | Hydro- | Comparative Example | | Treatments of the invention | | |
| α-Cyano- | phobic | | Heated at | 1st treatment | 2nd treatment | |
| acrylate | silica | | 205° C. for | Heated in | Treated with acid gas | |
| (wt. %) | (wt. %) | Untreated | 15 min | vacuum | pH 5.7–6.2 | pH 2.6–5.5 |
| 93.0 | A 7.0 | Gelled in less than 1 day | Gelled in 1 day | Gelled in 4–5 days | Slightly thickened in 9–10 days | Satisfactory for more than 16 days |
| 93.0 | B 7.0 | Gelled in 2–3 days | Gelled in 3–4 days | Gelled in 6–7 days | Slightly thickened in 9–10 days | Satisfactory for more than 16 days |
| 93.0 | C 7.0 | Gelled in 2–3 days | Gelled in 3–4 days | Gelled in 6–7 days | Slightly thickened in 9–10 days | Satisfactory for more than 16 days |
| 9.3 | D 7.0 | Gelled in 2–3 days | Gelled in 3–4 days | Gelled in 6–7 days | Slightly thickened in 9–10 days | Satisfactory for more than 16 days |

Note: α-Cyanoacrylate: Ethyl ester containing 40 ppm of SO$_2$ and 1200 ppm of hydroquinone added.

EXAMPLE 2

Hydrophobic silica surface-treated with HMDS (Tullanox TM 500) was treated by the process of the invention to obtain hydrophobic silicas having varying pH values. Seven wt. % (based on the composition) of each silica was admixed with ethyl α-cyanoacrylate (containing 40 ppm of SO$_2$ and 1200 ppm of hydroquinone) to prepare an adhesive composition. The compositions thus obtained were tested for setting time and storage stability. Table 3 shows the results.

The setting time of the composition comprising the cyanoacrylate and the silica of the invention is adjustable according to the contemplated purpose, by varying the pH of the silica in the range of from about 3.0 to about 5.7.

The properties were measured by the following methods.

Setting time:

TABLE 3

| | pH* | Setting Time (sec) | Storage stability determined by accelerated degradation test |
|---|---|---|---|
| Untreated | 9.7 | 5 | Gelled in less than 1 day. |
| Heating at 205° C. for 15 min | 8.5 | 10 | Gelled in 1 day. |
| Treatment of invention | 7.1 | 10 | Gelled in 4–5 days. |
| | 6.6 | 15 | Thickened in 6–7 days. |
| | 6.2 | 15–20 | Slightly thickened in 10 days |
| | 5.7 | 20 | No gelation or thickening in 16 days. |
| | 5.5 | 20 | No gelation or thickening in 16 days. |
| | 4.7 | 20–25 | No gelation or thickening in 16 days. |
| | 4.2 | 30 | No gelation or thickening in 16 days. |
| | 3.8 | 35–40 | No gelation or thickening in 16 days. |
| | 3.1 | 45 | No gelation or thickening in 16 days, slightly thickened in 19 days. |
| | 2.7 | 70–80 | No gelation or thickening in |

TABLE 3-continued

| pH* | Setting Time (sec) | Storage stability determined by accelerated degradation test |
|---|---|---|
| | | 20 days. |

Note: *pH of hydrophobic silica

EXAMPLE 3

Four hundred parts by weight of hydrophobic silica surface-treated with HMDS and exhibiting a pH of 9.7 (brand name: Tullanox TM 500, product of Tulco Co., U.S.A.) was heated in a 27-liter square vacuum dryer at a reduced pressure of up to 3 mm Hg at 60° to 65° C. for 12 to 15 hours while being allowed to stand (first treatment). The hydrophobic silica thus treated was 7.1 to 7.15 in pH. The silica was then placed into a 10-liter rotary evaporator (comprising a rotatable flask and an inner buffer plate for thoroughly stirring the finely divided silica), the evaporator was evacuated to 30 mm Hg, and $BF_3$ was then introduced into the flask to an internal pressure of 40 to 45 mm Hg. The silica was thereafter brought into full contact with the $BF_3$ gas by rotating the flask for 3 to 20 minutes. Subsequently, the flask, as evacuated to a reduced pressure of up to 10 mm Hg, was held in a water bath at 35° to 40° C. for 30 to 90 minutes while being rotated to expel the $BF_3$ gas.

When the silica thus treated according to the invention was dispersed in a methanol-water solution (50:50 by volume), the solution had a pH of 5.2. The silica of the invention was admixed with ethyl α-cyanoacrylate (containing 40 ppm of $SO_2$ and 1200 ppm of hydroquinone) to obtain compositions containing the silica in varying concentrations of 0.5 to 13 wt. %. The compositions were tested for properties, with the results shown in Table 4.

Hydrophobic silica surface treated with HMDS was admixed, as untreated or as merely heat-treated at 205° C. for 15 minutes, with ethyl α-cyanoacrylate to prepare compositions containing 5 wt. % of the silica. When heated at 70° C., these compositions gelled in one day. On the other hand, when the compositions comprising 0.5 to 10 wt. %, preferably 3 to 9 wt. %, of the silica treated by the process of the invention and ethyl α-cyanoacrylate containing an organic polymer were similarly heated at 70° C., the compositions exhibited satisfactory stability even after the lapse of 16 days, while the variations in the setting time of these compositions with the lapse of time were within an allowable range for adhesive compositions of this type.

The tensile shear strength and storage stability were determined by the following methods.

Tensile shear strength:
According to JIS K 6861, Item 6, using Autograph S-2000, product of Shimadzu Seisakusho Ltd.

Storage stability:
The specimen was placed into a polyethylene tube and an aluminum tube, both 2 to 3 g in capacity, allowed to stand with the tubes held in an oven maintaining at 70±2° C., and checked for changes with time. When there was no difference between the specimen and a control after the specimen had been tested for 10 to 16 days; it was speculated that the composition would remain stable for at least one year at room temperature.

TABLE 4

| | Adhesive composition | | | | Initial adhesion | | As heated at 70° C. for 16 days | |
|---|---|---|---|---|---|---|---|---|
| | Component | | | | | | | |
| | Ethyl α-cyano acrylate (wt. %) | Silica of invention (wt. %) | Organic polymer (wt. %) | Appearance of composition | Setting time (sec) | Tensile Shear strength (kg/cm²) | Setting time (sec) | Stability |
| Composition of the invention | 96.0 | 0.5 | 3.5 | Flowable liquid | 5 | 134 | 15 | Good |
| | 96.0 | 1.0 | 3.0 | " | 5 | 136 | 15 | " |
| | 95.5 | 2.0 | 2.5 | " | 5 | 144 | 10 | " |
| | 95.5 | 3.0 | 2.0 | Soft paste | 10 | 152 | 25 | " |
| | 93.3 | 5.0 | 1.7 | Smooh paste | 15 | 167 | 30 | " |
| | 91.5 | 7.0 | 1.5 | " | 20 | 163 | 45 | " |
| | 89.8 | 9.0 | 1.2 | " | 35 | 145 | 60 | " |
| | 89.0 | 10.0 | 1.0 | " | 40 | 130 | 75 | Slightly thickened |
| | 87.5 | 12.0 | 0.5 | Slightly hard paste | 50 | 121 | 130 | Slightly thickened |
| | 86.5 | 13.0 | 0.5 | Hard paste | 70 | 125 | — | Thickened |
| Comparative Example | 93.3 | Untreated silica (pH 9.7) 5.0 | 1.7 | Smooth paste | 5 | 159 | — | Gelled in one day |
| | 93.3 | As heated at 205° C. for 15 min 5.0 | 1.7 | Smooth paste | 5 | 141 | — | Gelled in one day |

Note: Organic polymer: polymethyl methacrylate 500,000–600,000 in molecular weight.

EXAMPLE 4

Hydrophobic silica surface-treated with HMDS and having a pH of 7.3 (brand name: Aerosil R812, sold by Nippon Aerosil Co., Ltd.) was treated in the same manner as in Example 3 with the exception of using $SO_2$ gas in place of $BF_3$ to obtain hydrophobic silica of the invention having a pH of 3.6. Varying proportions of the silica were admixed with various α-cyanoacrylates as shown in Table 5 to obtain compositions, which were then tested for properties. Table 5 shows the results.

TABLE 5

| | | Adhesive composition | | | Initial adhesion | | As heated at 70° C. for 15 days | |
|---|---|---|---|---|---|---|---|---|
| | α-Cyano-acrylate (91.9 wt. %) | Silica of invention (pH 3.6) (wt. %) | Organic polymer (wt. %) | Stabilizer (ppm) | Setting time (sec) | Tensile shear strength (kg/cm) | Setting time (sec) | Stability |
| Composition of the invention | Methyl ester | 6.5 | 1.6 | $SO_2$: 20 MS: 30 HQ: 1200 | 20 | 207 | 35 | Good |
| | Ethyl ester | 6.5 | 1.6 | $SO_2$: 40 HQ: 1200 | 20 | 165 | 45 | " |
| | 2-Methoxy-isopopyl ester | 6.5 | 1.6 | $SO_2$: 30 HQ: 500 | 25 | 125 | 40 | " |
| | Methyl ester | Untreated (pH 7.2) 6.5 | 1.6 | $SO_2$: 20 MS: 30 HQ: 1200 | 10 | 196 | — | Gelled in 1 day |
| | Methyl ester | (pH 6.9) 6.5 | | $SO_2$: 20 MS: 30 HQ: 1200 | 15 | 210 | — | Gelled in 2 days |
| Comparative Example | 2-Methoxy-isopropyl ester | Untreated 6.5 | 1.6 | $SO_2$: 30 HQ: 500 | 15 | 127 | — | Gelled in 3 days |
| | 2-Methoxy-isopropyl ester | As heated at 205° C. for 15 min 6.5 | 1.6 | $SO_2$: 30 HQ: 500 | 20 | 135 | — | Gelled in 3 days |

Note: $SO_2$ = sulfur dioxide, MS = methanesulfonic acid, HQ = hydroquinone

I claim:

1. An adhesive composition characterized in that the composition is prepared by subjecting finely divided hydrophobic silica surface-treated with hexamethyldisilazane to a heat treatment under a reduced pressure, subsequently treating the silica with an acid gas, and admixing the resulting silica with an α-cyanoacrylate.

2. A composition as defined in claim 1 wherein the heat treatment is conducted under a reduced pressure of up to 10 mm Hg at 40° to 200° C. for 5 to 30 hours.

3. A composition as defined in claim 1 wherein the acid gas is in the form of a gas at a pressure of 760 mm Hg at a temperature of up to 25° C. and is a compound selected from the group consisting of fluorides of elements from the groups III, IV and V, hydrogen halides and acid oxides.

4. A composition as defined in claim 1 wherein the acid gas is at least one of $SO_2$, $BF_3$ and HCl.

5. A composition as defined in claim 1 wherein the acid gas treatment is so conducted that when the resulting silica is dispersed in an aqueous solution composed of 50 vol. % of methanol and 50 vol. % of water to a concentration of 4 wt. %, the solution exhibits a pH of 2.6 to 6.2.

* * * * *